United States Patent
Wang

(10) Patent No.: US 6,822,296 B2
(45) Date of Patent: Nov. 23, 2004

(54) COMPLEMENTARY METAL OXIDE SEMICONDUCTOR STRUCTURE FOR BATTERY PROTECTION CIRCUIT AND BATTERY PROTECTION CIRCUIT HAVING THE SAME

(75) Inventor: Chi-Chang Wang, Hsinchu (TW)

(73) Assignee: TOPRO Technology, Inc., Hsinchu (TW)

( * ) Notice: Subject to any disclaimer, the term of this patent is extended or adjusted under 35 U.S.C. 154(b) by 0 days.

(21) Appl. No.: 10/423,690

(22) Filed: Apr. 24, 2003

(65) Prior Publication Data

US 2004/0065922 A1 Apr. 8, 2004

(30) Foreign Application Priority Data

Oct. 2, 2002 (TW) .......................... 91122708 A

(51) Int. Cl.[7] .............................................. H01L 23/62
(52) U.S. Cl. ................... 257/355; 307/482.1; 257/356; 257/360; 257/363; 257/448; 257/508
(58) Field of Search ................ 307/482.1; 257/356, 257/360, 363, 448, 508

(56) References Cited

U.S. PATENT DOCUMENTS

| | | | | |
|---|---|---|---|---|
| 5,200,639 A | * | 4/1993 | Ishizuka et al. | 257/508 |
| 5,220,218 A | * | 6/1993 | Hill et al. | 326/103 |
| 5,479,039 A | * | 12/1995 | Lien | 257/356 |
| 6,255,704 B1 | * | 7/2001 | Iwata et al. | 257/401 |
| 6,573,577 B1 | * | 6/2003 | Iwata et al. | 257/401 |
| 6,677,210 B1 | * | 1/2004 | Hebert | 438/301 |

* cited by examiner

Primary Examiner—David Nelms
Assistant Examiner—Mai-Huong Tran
(74) Attorney, Agent, or Firm—J.C. Patents

(57) ABSTRACT

A complementary metal-oxide semiconductor (CMOS) structure for a battery protection circuit and a battery protection circuit therewith. A tri-well technique or a buried layer technique is used for such CMOS structure to allow the battery protection circuit therewith to operate at different low voltage levels. Thereby, low voltage process can be realized to effectively reduce the cost of the chip and simplify the design.

8 Claims, 4 Drawing Sheets

COMPLEMENTARY METAL OXIDE SEMICONDUCTOR STRUCTURE FOR BATTERY PROTECTION CIRCUIT AND BATTERY PROTECTION CIRCUIT HAVING THE SAME

CROSS-REFERENCE TO RELATED APPLICATION

This application claims the priority benefit of Taiwan application serial No. 91122708, filed Oct. 2, 2002.

BACKGROUND OF THE INVENTION

1. Field of the Invention

The invention relates to a semiconductor structure and a battery protection circuit having the same, and more particularly, to a low voltage complementary metal oxide semiconductor (CMOS) structure for a battery protection circuit using tri-well or buried layer technique and the battery protection circuit using such structure.

2. Description of Related Prior Art

The operation voltage for a cell lithium-ion battery pack is between 2.4 to 4.2 volts. The protection circuit of the lithium-ion battery pack uses a voltage detection circuit to provide the detection state of the voltage of each battery. While charging the lithium-ion battery pack, an external source voltage supplied to the lithium battery pack is switched off when the voltage is over 4.3 volts to avoid overcharge, so as to prevent explosion of the lithium-ion battery pack. When the operation voltage is lower than 2.3 volts, the discharging operation of the lithium-ion battery pack is switched off to avoid over-discharge that damages the lithium-ion battery pack and reduces the lifetime thereof.

The above voltage detection circuit can be referred to U.S. Pat. No. 6,225,779, "Power Supply Monitoring Integrated Circuit Device for Individually Monitoring Voltage of Cells" or U.S. Pat. No. 6,285,165 "Secondary Battery Protection Circuit".

The battery protection circuit further includes an excess current protection circuit and a short current protection circuit that switches off the load connection of the lithium-ion battery pack under abnormal condition of the operation current, and resumes to normal operation after the abnormal condition is released.

However, while using the CMOS process to realize the multi-cells lithium-ion battery protection circuit, being affected by the substrate bias, the operation voltage of the circuit is higher than the breakdown voltage of the low voltage CMOS process. Thus, the battery protection circuit for the battery can not be realized using the low voltage CMOS process.

SUMMARY OF THE INVENTION

The present invention provides a CMOS structure and a battery protection circuit including the same. The CMOS structure can be realized by tri-well or buried layer technique, such that the battery protection circuit of each battery can be operated with relatively low voltage without being affected by substrate bias. In addition, the chip area and cost are effectively reduced, and the design can be simplified.

The present invention further provides a CMOS structure and a battery protection circuit including such CMOS structure that has the function of isolating substrate noise.

The CMOS structure and the battery protection circuit including such CMOS structure provided by the present invention are operative to prevent the occurrence of an unbalanced condition in the battery to be protected.

The CMOS structure for a battery protection circuit comprises a P-type substrate, an N-type metal oxide semiconductor (NMOS) transistor and a P-type metal oxide semiconductor (PMOS) transistor. The P-type substrate includes a P-well and an N-well adjacent to each other, and the P-well has an N-type buried layer to isolate it from the substrate. The NMOS transistor is formed in the P-well, while the PMOS transistor is formed in the N-well. The NMOS transistor includes a gate connected to an input terminal, a source coupled to a first voltage level, and a drain coupled to an output terminal. The PMOS transistor has a gate coupled to the input terminal, a source coupled to a second voltage level, and a drain coupled to the output terminal, where the first voltage level is lower than the second voltage level.

The present invention further provides a CMOS structure for a battery protection circuit including an N-type substrate, an NMOS transistor and a PMOS transistor. The N-type substrate has a P-well and an N-well adjacent thereto, where the N-well includes a P-type buried layer to isolate it from the N-type substrate. The NMOS transistor is formed in the P-well, while the PMOS transistor is formed in the N-well. The NMOS transistor includes a gate coupled to an input terminal, a source coupled to a first voltage level, and a drain coupled to an output terminal. The PMOS transistor includes a gate coupled to the input terminal, a source coupled to a second voltage level, and a drain coupled to the output terminal, where the first voltage level is lower than the second voltage level.

The present invention also provides a CMOS structure for a battery protection circuit including a P-type substrate, an NMOS transistor and a PMOS transistor. A deep N-well is formed in the P-type substrate, and a P-well isolated from the P-type substrate is formed in the deep N-well. An NMOS transistor is formed in the P-well. The NMOS transistor includes a gate coupled to an input terminal, a source coupled to a first voltage level, and a drain coupled to an output terminal. A PMOS transistor is formed in the deep N-well and includes a gate coupled to the input terminal, a source coupled to a second voltage level, and a drain coupled to the output terminal.

The present invention further provides a CMOS structure for a battery protection circuit, including an N-type substrate, an NMOS transistor and a PMOS transistor. The N-type substrate includes a deep P-well formed in the N-type substrate, and an N-well is formed in the deep P-well isolated from the substrate. The NMOS transistor is formed in the deep P-well and comprises a gate coupled to an input terminal, a source coupled to a first voltage level, and a drain coupled to an output terminal. The PMOS transistor is formed in the N-well and includes a gate coupled to the input terminal, a source coupled to a second voltage level, and a drain coupled to the output terminal.

The present invention further provides a battery protection circuit to detect battery voltage and current of a battery pack, so as to protect the battery pack. The battery protection circuit includes a multi-overcharging and over-discharging units to monitor the voltage level of each battery of the multi-cell battery pack. The overcharging and over-discharging protection units are formed of a CMOS structure. The battery protection circuit further comprises a level shift circuit and a logic and delay circuit. The level shift circuit is coupled to the overcharging and the over-discharging units to adjust the potentials of multi-channel comparison signals output from the overcharging and over-discharging circuits. The logic and delay circuit is coupled to the level shift circuit to receive the adjusted comparison signals and controls the external switches. A first signal and a second signal are output in response to the comparison signals. If the potential of the first signal is logic 1, it indicates that the battery pack is over-discharging, and when the potential of the second signal is logic 1, the battery pack is overcharging.

The CMOS structure of the above overcharging and over-discharging units includes various types of structures.

In addition, an excess current protection unit, a short circuit protection unit and a voltage regulator are also applied to above battery protection circuit. The excess current protection unit and the short current protection unit provide the protection by switching off the load of the lithium-ion battery pack when the current of the battery pack is under an abnormal operation condition. A level shift circuit is used to adjust the potentials of a set of comparison signals. A logic and delay circuit is also included and coupled to the level shift circuit to receive the comparison signals after being adjusted. The logic and delay circuit further outputs a signal to an external switch after integrating the detection results of the over-discharging unit. The voltage regulator provides source voltage to the excess current protection unit and the short circuit current protection unit.

The CMOS structure of the above excess current protection unit and short-circuit current protection unit include various types of structures as mentioned above.

In the above battery protection circuit, the overcharging and over-discharging units further comprise a first comparator, a second comparator, and a bandgap reference voltage-generating unit which is coupled to the first and second comparators. Wherein, the first comparator is coupled to a voltage level that is to be monitored, and outputs a first signal after comparing the voltage level with a reference voltage, provided by the bandgap reference voltage-generating unit. The second comparator is coupled to the voltage level to be monitored by the first comparator and outputs the second signal after comparing with a reference voltage provided by the bandgap reference voltage-generating unit.

The battery protection circuit of the present invention, that uses a bandgap reference voltage-generating unit to generate the reference voltage and the comparator, requires a relatively low voltage and current to reduce power consumption. In addition, the excess current protection unit, the short circuit protection unit and the voltage regulator avoid any unbalanced condition generated by the battery pack during operation of the circuit protection circuit.

The battery protection circuit using the tri-well or buried layer structure is also operative to isolate the substrate noise.

BRIEF DESCRIPTION OF THE DRAWINGS

The object and advantages of the present invention will become more apparent by describing in detail a preferred embodiment thereof with reference to the attached drawings in which.

DETAILED DESCRIPTION OF THE INVENTION

Figure 1:
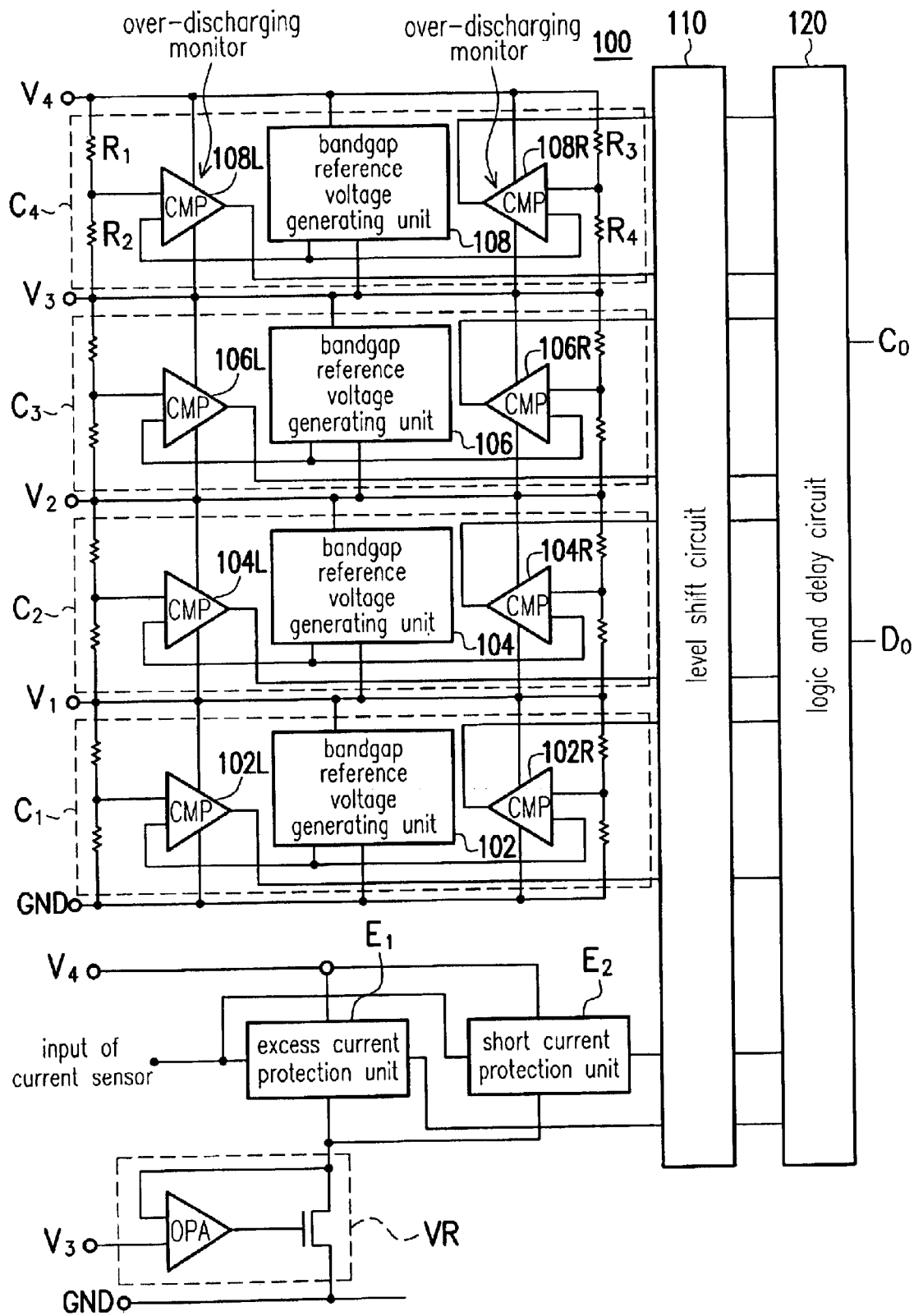
FIG. 1 shows a block diagram of a battery protection circuit in one preferred embodiment of the present invention.

Referring to FIG. 1, a battery voltage protection circuit 100 is illustrated. The battery protection circuit includes four overcharging and over-discharging protection units C1, C2, C3 and C4 at a left hand side thereof. The amount of the overcharging and over-discharging protection units is determined according to number of voltages to be monitored. In this embodiment, four voltages V1, V2, V3 and V4 are used as an example without limiting the application range of the present invention. In addition to the overcharging and over-discharging units C1, C2, C3 and C4, an excess current protection unit E1, a short current protection unit E2, a voltage regulator VR, a level shift circuit 110 and a logic and delay circuit 120 are included.

Each of the overcharging and over-discharging protection units C1, C2, C3 and C4 further comprises two comparators CMP and a bandgap reference voltage generating unit. For example, the overcharging and over-discharging unit C1 includes a comparator CMP 102L, the comparator CMP 102R, and a bandgap reference voltage generating unit 102. Other overcharging and over-discharging units C2, C3 and C4 comprise comparators 104L and 104R, 106L and 106R, 108L and 108R, and bandgap reference generating unit 104, 106 and 108, respectively.

The overcharging and over-discharging protection unit C4 is exemplarily described as follows. The comparator 108L has one input terminal coupled to a voltage value obtained from a division of the voltages V4 to V3 to be monitored across two resistors R1 and R2, and the other terminal coupled to an output terminal of a bandgap reference voltage generating unit 108. The comparison result of the comparator 108L is output to the level shift circuit 110, while the result is used to monitor whether the voltage level from the voltage V4 to the voltage V3 is over-discharged. Another comparator 108R includes an input terminal connected to the voltage value of a division of the voltages V4 to V3 to be monitored across the resistors R3 and R4, and the other input terminal coupled to the bandgap reference voltage generating unit 108. The comparison result of the comparator 108R is output to the level shift circuit 110 and used to monitor whether the voltage level from the voltage V4 to the voltage V3 is overcharged.

The operation of other overcharging and over-discharging protection units C1, C2 and C3 is similar. For example, the comparator 106L monitors whether the voltage level from the voltage V3 to the voltage V2 is over-discharged, while the comparator 106R is used to monitor whether the voltage level from the voltage V3 to the voltage V2 is overcharged. The comparator 104L is used to monitor whether the voltage level from the voltage V2 to the voltage V1 is over-discharged, while the other comparator 104R is used to monitor whether the voltage level from the voltage V2 to the voltage V1 is overcharged. The comparator 102L is used to monitor whether the voltage V1 to the ground level is over-discharged, while the other comparator 106R is used to monitor whether the voltage V1 to the ground is overcharged.

The bandgap reference voltage generating unit 108 in the overcharging and over-discharging protection unit C4 connects the power source to the voltages V4 to V3 to be monitored, and outputs a reference voltage from an output terminal thereof. The source voltage of the reference voltage is the voltage V4 to V3 to be monitored. However, the bandgap reference voltage is independent of the operation temperature, process condition and voltage variation. In the overcharging and over-discharging unit C2, the bandgap reference voltage generating unit 104 is coupled to the voltage V2 to ground. In the overcharging and over discharging unit C3, the bandgap reference voltage generating unit 106 is connected to the voltage V3 to V2.

To employ the low voltage process, reduce the cost and simplify the design, and to obtain consistent performance of the components in the battery voltage protection circuit 100, the voltage V4 is about four times of the voltage V1, the voltage V3 is about three times of the voltage V1, and the voltage V2 is about two times of the voltage V1. The variation range of the voltage V1 is between about 2V to about 4.4V. Thus, the voltage difference connected to each overcharging and over-discharging unit and each bandgap reference voltage generating unit is between about 2V to about 4.4V.

The level shift circuit 110 amplifies and outputs the signal voltage level related to the overcharging, over-discharging, excess current protection unit E1, and the short current protection unit E2 output from the overcharging and over-discharging units C1, C2, C3 and C4 to the logic and delay circuit 120. The level shift circuit 110 also outputs signals CO and DO to switch on or off the switch for controlling the battery protection circuit (not shown). The switch is typically a power metal oxide semiconductor (PowerMOS) transistor.

The battery protection circuit further comprises an excess current protection unit E1, a short current protection unit E2, and a voltage regulator VR. The excess current protection unit E1 and the short current protection unit E2 are connected to an input voltage detected by an external current sensor in response to the voltage variation from the voltage V4 to ground. In addition, the power sources of the excess current protection unit E1 and the short current protection unit E2 are connected to the output of the voltage V4 to the voltage regulator VR. Thereby, the operation voltage range of the excess and short current protection units is ensured between about 2V to about 4.4V. The excess current circuit E1 and the short current protection unit E2 connected to the level shift circuit 110 provide protection when the abnormal condition occurs to operation of the load. The voltage regulator VR comprises an operation amplifier and a high voltage transistor to generate voltage equivalent to the voltage V3. Therefore, the excess current protection unit E1 and the short current protection unit E2 are both realized by low voltage process.

In the conventional multi-cell battery pack such as a lithium ion battery, the circuit operation voltage of the circuit is higher than the breakdown voltage of the CMOS process. Thus, the protection circuit of the battery pack can not be designed by using low-voltage CMOS process. The embodiment of the present invention is implemented by tri-well or buried layer technique to form the CMOS structure on the substrate. For example, the overcharging and over-discharging protection units C1, C2, C3 and C4 and the excess current unit E1 and the short current unit E2 are formed on the tri-well or buried layer structure using CMOS process. Therefore, the protection circuit of the battery pack is not affected by the substrate bias to operate under different low voltage, so to effectively reduce the chip cost and simplify the design.

Figure 2A:
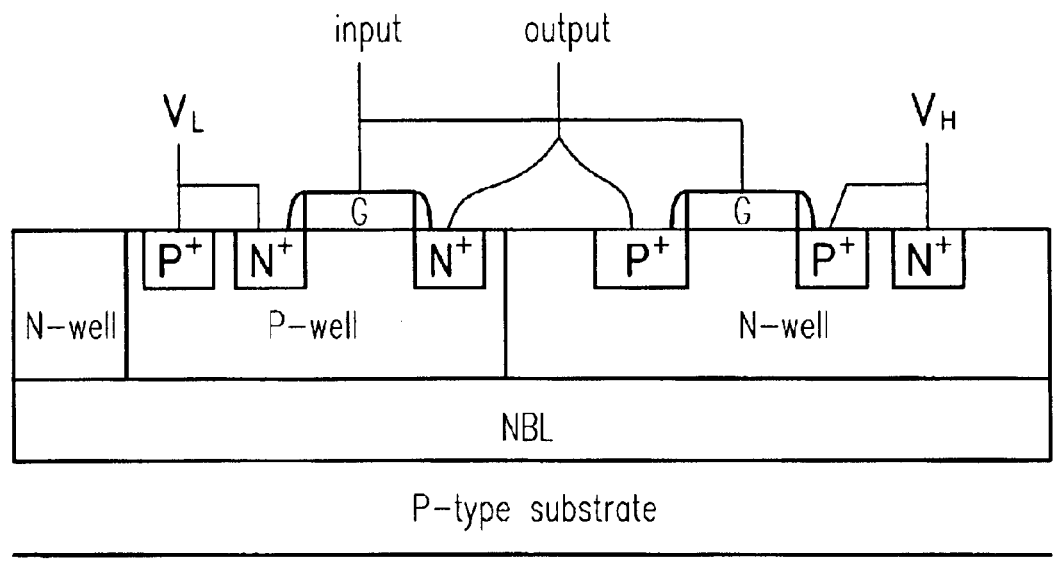
FIG. 2A shows an embodiment of a device structure in which a buried technique of CMOS process is applied to a P-type substrate of the battery protection circuit as shown in FIG. 1.

One embodiment of the present invention as shown in FIG. 2A is constructed on a P-type substrate and uses CMOS process technique. In FIG. 2A, an N-type buried layer (NBL) is formed on the P-type substrate. The NMOS transistor at the left hand side is formed in a P-well. The P-well has an N-well at the left hand side thereof as a barrier to isolate it from the P-type substrate. The gate of the NMOS transistor is coupled to an input terminal, the source thereof is coupled to a low voltage $V_L$, and a drain of the NMOS transistor is coupled to an output terminal. In addition, a PMOS transistor is formed in an N-well. The PMOS transistor has a gate coupled to the input terminal, a source coupled to a high voltage $V_H$, and a drain coupled to the output terminal.

Figure 2B:
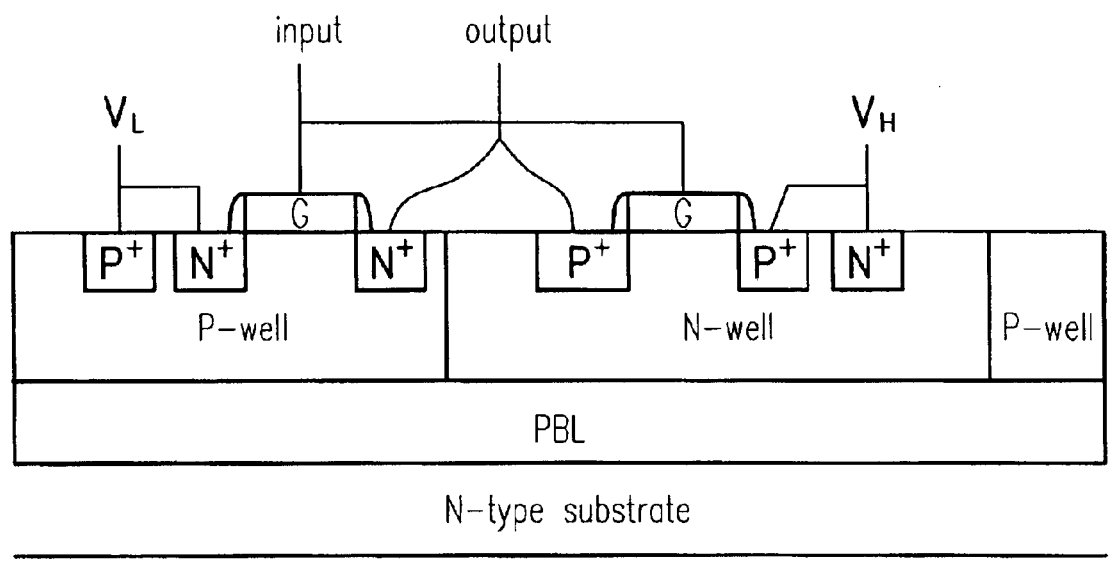
FIG. 2B shows an embodiment of a device structure in which a buried technique of CMOS process is applied to an N-type substrate of the battery protection circuit as shown in FIG. 1.

The embodiment of the present invention as shown in FIG. 2B is constructed on an N-type substrate using CMOS process technique. In FIG. 2B, a P-type buried layer (PBL) is formed on an N-type substrate. An NMOS transistor is formed in a P-well. The NMOS transistor has a gate coupled to an input terminal, a source coupled to a low voltage $V_L$, and a drain coupled to an output terminal. A PMOS transistor is formed in an N-well. A P-well is formed at the right hand side of the N-well as a barrier to isolate it from the N-type substrate. The PMOS transistor has a gate coupled to the input terminal, a source coupled to a high voltage $V_H$, and a drain coupled to an output terminal.

Figure 3A:
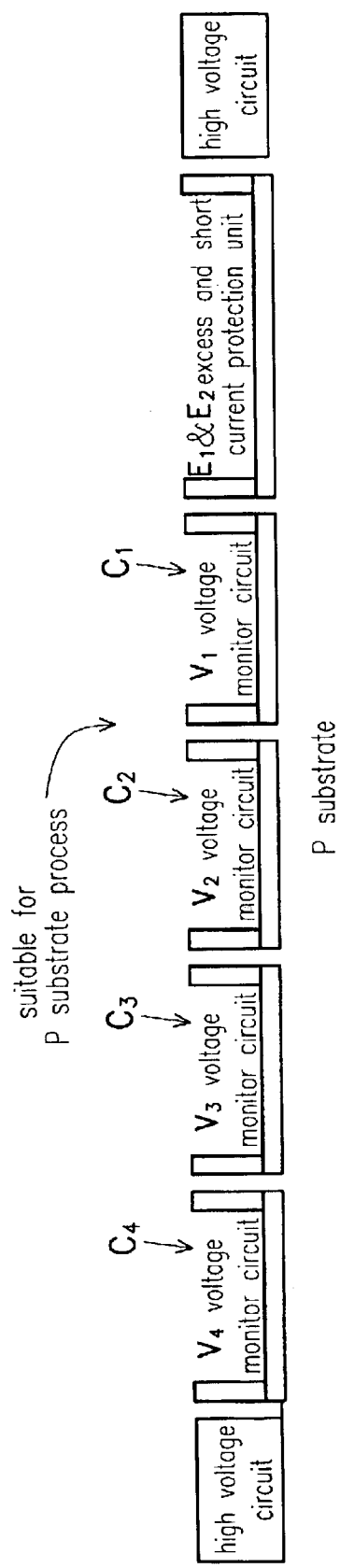
FIG. 3A shows an embodiment of a structure in which a technique of a CMOS process is applied to a P-type substrate of the battery protection circuit as shown in FIG. 1.
Figure 3B:
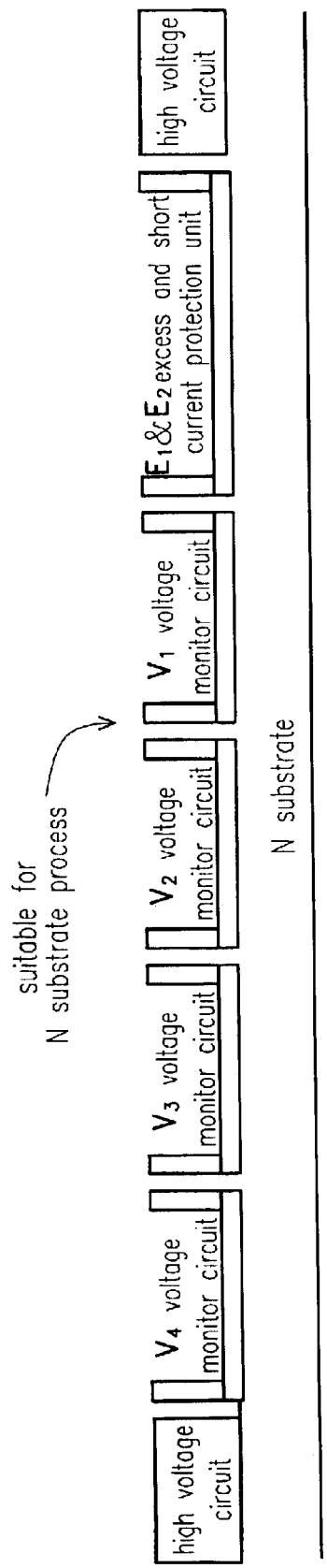
FIG. 3B shows an embodiment of a structure in which a technique of a CMOS process is applied to a P-type substrate of the battery protection circuit as shown in FIG. 1.

In application, the tri-well or buried layer technique is used to form the CMOS structure on the substrate. For example, the above overcharging and over-discharging protection unit can be realized by a low voltage process. The excess current protection unit E1 and the short current protection unit E2 are also formed on the tri-well or buried-layer structure using low voltage CMOS process. The layout of the entire circuit on the substrate are shown in FIGS. 3A and 3B. As shown in FIG. 1, the battery voltage protection circuit 100 can be formed on the layout included in the high voltage circuit as shown in FIG. 3A. The overcharging and over-discharging protection units C1, C2, C3 and C4 are formed on the P-type substrate. Referring to FIG. 3B, in one embodiment, the battery voltage protection circuit 100, the excess current protection unit E1 and the short current protection unit E2 in FIG. 1 can be formed on an N-type substrate using a low voltage process and over the position of the high voltage circuit.

Figure 4A:
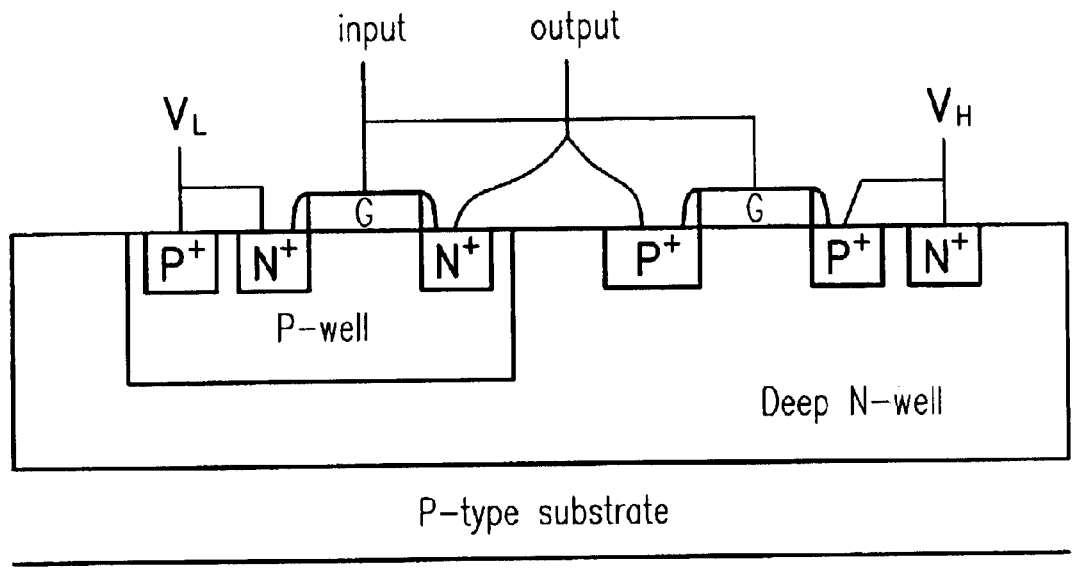
FIG. 4A shows an embodiment of a device structure in which a tri-well technique of a CMOS process is applied to a P-type substrate of the battery protection circuit as shown in FIG. 1.
Figure 4B:
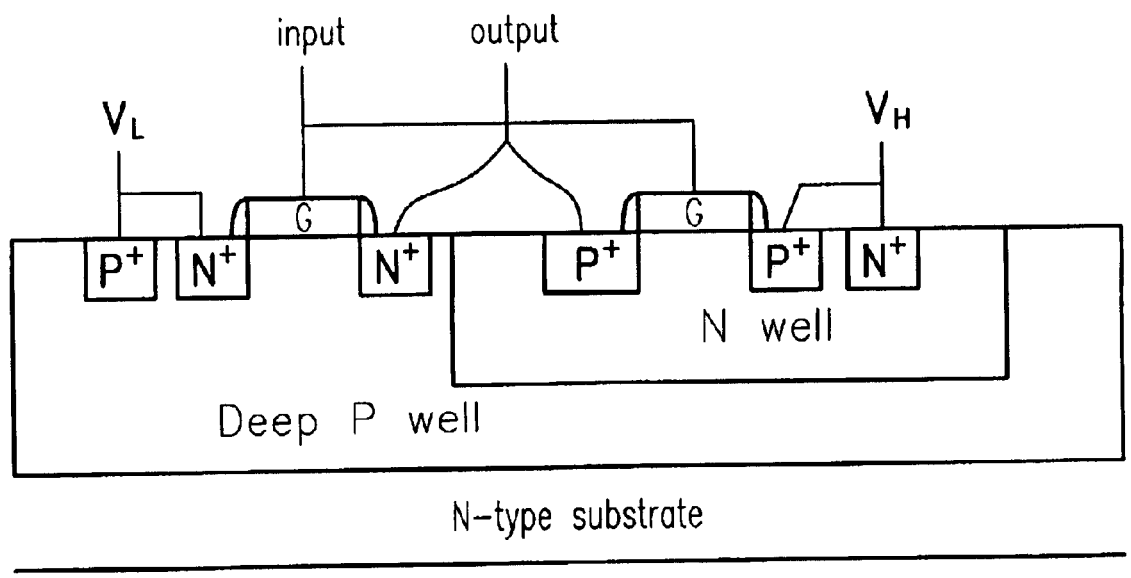
FIG. 4B shows an embodiment of a device structure in which a tri-well technique of a CMOS process is applied to an N-type substrate of the battery protection circuit as shown in FIG. 1.

In addition to the embodiment as shown in FIGS. 2A and 2B, the present invention further provides other embodiments as shown in FIGS. 4A and 4B. Referring to FIG. 4A, the CMOS transistor is constructed on a P-type substrate. A deep N-well is formed on the P-type substrate. At the left hand side of the deep N-well, a P-well surrounded by the deep N-well and isolated from the P-type substrate is formed. An NMOS transistor is formed in the P-well. The NMOS transistor comprises a gate coupled to the input terminal, a source coupled to a low voltage $V_L$, and a drain coupled to an output terminal. A PMOS transistor is formed at the right hand side of the deep N-well. The PMOS transistor has a gate coupled to the input terminal, a source coupled to a high voltage $V_H$, and a drain coupled to the output terminal.

In another embodiment as shown in FIG. 4B, the CMOS transistor is formed on an N-type substrate. A deep P-well is formed on the N-type substrate. An N-well surrounded by the deep P-well and isolated from the N-type substrate is formed at the left hand side on the N-well. An NMOS transistor is formed in the deep P-well. The NMOS has a gate coupled to an input terminal, a source coupled to a low voltage level $V_L$, and a gate coupled to an output terminal. A PMOS transistor is formed in the N-well. The PMOS transistor has a gate coupled to the input terminal, a source is coupled to a high voltage level $V_H$, and a drain is coupled to the output terminal.

In the tri-well or buried layer technique, the battery protection circuit is constructed on a substrate using low voltage CMOS process technique. For example, overcharging and over-discharging protection units C1, C2, C3 and C4, the excess current protection unit E1, and the short current protection unit E2 are formed on the substrate using the CMOS process technique. Thereby, the battery protection circuits can be isolated from the substrate and operated under different low voltages. The chip area is shrunk, the chip cost is reduced, and the design is simplified.

In addition, in one embodiment of the present invention, the bandgap reference voltage generating unit and the comparator are provided, such that lower voltage and less current are required to reduce power consumption. The voltage regulator VR is further used. Thus, while operating the excess current and short current protection units, unbalanced condition will not occur to the battery pack. In addition, by using the CMOS process to complete the tri-well and buried layer structure, the substrate noise is isolated.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A complementary metal oxide semiconductor structure suitable for use in a battery protection circuit, comprising:
    a P-type substrate, having a P-well and an N-well adjacent to each other, wherein the P-well has an N-type buried layer isolated from the P-type substrate;
    an N-type metal oxide semiconductor transistor formed in the P-well and a P-well formed in the N-well, wherein the N-type metal oxide semiconductor transistor has a gate coupled to an input terminal, a source coupled to a first voltage, and a drain coupled to an output terminal, the P-type metal oxide semiconductor transistor has a gate coupled to the input terminal, the source coupled to a second voltage, and a drain coupled to the output terminal, the first voltage is lower than the second voltage,
    wherein the input terminal and output terminal are respectively coupled to a first monitored voltage and a second monitored voltage in the battery protection circuit for monitoring and protecting within a voltage range.

2. A battery protection circuit structure, having the complementary metal-oxide semiconductor structure as claimed in claim 1.

3. A complementary metal oxide semiconductor suitable for use in a battery protection circuit, comprising:
    an N-type substrate, having a P-well and an N-well adjacent to each other, wherein the N-well further comprises a P-type buried layer isolated from the N-type substrate;
    an N-type metal oxide semiconductor transistor formed in the P-well and a P-type metal oxide semiconductor transistor formed in the N-well, wherein the N-type metal oxide semiconductor transistor comprises a gate coupled to an input terminal, a source coupled to a first voltage level, a drain coupled to an output terminal, the P-type metal oxide semiconductor transistor comprises a gate coupled to the input terminal, a source coupled to a second voltage level, and a drain coupled to the output terminal, the first voltage level is lower than the second voltage level,
    wherein the input terminal and output terminal are respectively coupled to a first monitored voltage and a second monitored voltage in the battery protection circuit for monitoring and protecting within a voltage range.

4. A battery protection circuit structure, comprising the complementary metal oxide semiconductor as claimed in claim 3.

5. A complementary metal oxide semiconductor, comprising:
    a P-type substrate, on which a deep N-well is formed, wherein the deep N-well comprises a P-well isolated from the P-type substrate;
    an N-type metal oxide semiconductor formed in the-P-well, having a gate coupled to an input terminal, a source coupled to a first voltage level, and a drain coupled to an output terminal; and
    a P-type metal oxide semiconductor formed in the deep N-well, having a gate coupled to the input terminal, a source coupled to a second voltage level, and a drain coupled to the output terminal,
    wherein the input terminal and output terminal are respectively coupled to a first monitored voltage and a second monitored voltage in the battery protection circuit for monitoring and protecting within a voltage range.

6. A battery protection circuit structure, comprising the complementary metal oxide semiconductor structure as claimed in claim 5.

7. A complementary metal oxide semiconductor structure, comprising:
    an N-type substrate, comprising a deep P-well and an N-well formed in the deep P-well isolated from the substrate;
    an N-type metal oxide semiconductor transistor formed in the deep P-well, having a gate coupled to an input terminal, a source coupled to a first voltage level, and drain coupled to an output terminal; and
    a P-type metal oxide semiconductor transistor formed in the N-well, having a gate coupled to an input terminal, a source coupled to a second voltage level, and drain coupled to an output terminal,
    wherein the input terminal and output terminal are respectively coupled to a first monitored voltage and a second monitored voltage in the battery protection circuit for monitoring and protecting within a voltage range.

8. A battery protection circuit structure, comprising the complementary metal oxide semiconductor structure as claimed in claim 7.

* * * * *